Aug. 1, 1967  N. O. ROSAEN  3,333,697
BAYONET FILTERS
Filed June 24, 1966  6 Sheets-Sheet 1

INVENTOR.
NILS O. ROSAEN
BY
Hauke + Hauke
ATTORNEYS

Aug. 1, 1967

N. O. ROSAEN 3,333,697

BAYONET FILTERS

Filed June 24, 1966

INVENTOR.
NILS O. ROSAEN

BY

ATTORNEYS

FIG. 8

INVENTOR
NILS O. ROSAEN

FIG. 9

United States Patent Office 3,333,697
Patented Aug. 1, 1967

3,333,697
BAYONET FILTERS
Nils O. Rosaen, Bloomfield Hills, Mich., assignor to The Rosaen Filter Company, Hazel Park, Mich., a corporation of Michigan
Filed June 24, 1966, Ser. No. 565,031
7 Claims. (Cl. 210—90)

The present application is a continuation-in-part of my copending applications No. 328,432, filed Dec. 5, 1963; Ser. No. 393,863, filed Sept. 2, 1964; and Ser. No. 393,861, filed Sept. 2, 1964, and now abandoned.

The present invention relates to fluid systems, particularly to those fluid systems having a filter device adapted to be readily inserted into and removed from a reservoir for such systems and more particularly to such a filter device having valve means operable to permit continued operation of the fluid system during removal of the filter element for cleaning or replacement and means operable to release air entrapped within the filter device both during operation of the system and upon installation of the clean or new filter.

My copending applications Ser. No. 562,417, filed June 8, 1966 and now Patent No. 3,313,417, and Ser. No. 563,625, filed June 24, 1966 and now Patent No. 3,313,418, disclose certain new mobile or bayonet filter devices which are adapted to be inserted into the reservoir of fluid systems. These new filter devices have the particular advantage that much of the housing structure heretofore necessary for filter devices is eliminated. This produces a substantial reduction in manufacturing costs for such devices. Further the filter devices are readily accessible upon removal of the filter element for cleaning or replacement and means are provided for bypassing the filter element when it reaches a predetermined clogged condition. Indicating means are provided exteriorly of the devices for indicating the condition of the filter element.

Although these filter devices have proven to be quite satisfactory, the device of the present invention offers considerable improvement over those heretofore disclosed. In each of my aforementioned mobile filter devices, it has been necessary to completely shut down the operation of the fluid system while the filter element is being cleaned or replaced. This results in considerable loss of operating time for the fluid systems since the filter element periodically becomes clogged and must be removed for either cleaning or replacement to restore the efficiency of the device.

Further, it has been found that during operation of the filter device, air tends to become trapped in several areas within the filter housing. Unless means are provided for evacuating air so entrapped, inefficient operation of the filtering device may result. Further, unless means are provided for releasing air trapped within the filter housing during operation of the system, the air may be ejected into the system at irregular intervals in large amounts during operation thereby possibly causing damage to the associated system components and tending to upset the desired uniform outlet pressure.

The filter device of the present invention overcomes these problems by first providing a valving means which is operable as the filter element is being removed to open a sealed fluid bath directly from the inlet of the device to the outlet. In this way, it is possible to continue operation of the system without interruption while the filter element is being replaced or cleaned. In one embodiment of the invention, means are also provided for evacuating air from the filter device prior to restoring fluid flow through the filter element.

In other embodiments of the invention means are provided which are operable during operation of the filter device to remove the air from several areas within the filter housing where the air can become trapped to thus provide a much more efficient operating filtering device than those heretofore disclosed.

It is an object then of the present invention to improve mobile or bayonet filter devices of the type disclosed in my aforementioned copending applications by providing such a filter device having valving means automatically operable to open a sealed fluid path directly from the inlet of the device to the outlet of the device upon removal of the filter element.

It is another object of the present invention to increase the operating time of fluid systems having filter devices by providing means permitting continued and uninterrupted operation of the system during removal of the filter element.

It is still another object of the present invention to improve such filter devices by providing improved means operable to release air entrapped in such devices.

It is still another object of the present invention to increase the efficiency of such filter devices by providing means continuously operable during operation of the fluid system to bleed air entrapped within the filter housing of such filter devices.

Still further objects and advantages of the present invention will readily occur to one skilled in the art to which the invention pertains upon reference to the following drawings in which like reference characters refer to like parts throughout the several views and in which.

Now referring to the drawings for a more detailed description of the present invention, one preferred fluid system is illustrated in FIGS. 1–6 as comprising the fluid reservoir 10, a filter device 12, a fluid pump 14 and a fluid user 16.

Figure 1:
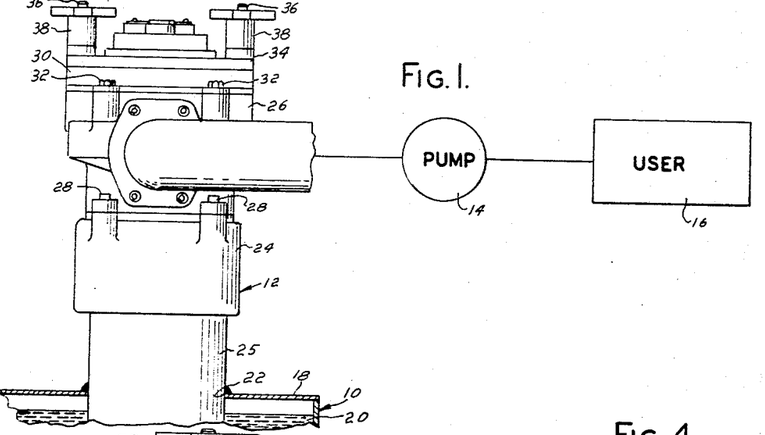
FIG. 1 is a fragmentary view of a preferred fluid system of the present invention with parts of the system illustrated diagrammatically and other portions shown in section for purposes of clarity.

The fluid reservoir 10 preferably comprises a top plate 18 and as shown in FIG. 1 is at least partially filled with a suitable fluid 20. An opening 22 is provided in the plate 18.

The filter device 12 preferably includes an elongated tubular housing member 24, a tubularly shaped extension 25 threaded into the interior of the housing member 24 and extending axially through the opening 22. The tubular extension 25 is shown in FIG. 1 as being welded to the top plate 18 although it is apparent that any other means for securing the extension 25 to the plate 18 could be used as well. The extension 25 is preferably positioned with one end within the reservoir 10 and the other end exteriorly thereof.

The filter device 12 preferably further comprises a housing member 26 secured to the tubular housing member 24 by bolts 28, a spacer housing member 30 secured to the housing member 26 as by bolts 22 and clean out cap member 34 secured to the spacer member 30 as by threaded members 36 and nuts 38.

Figure 2:
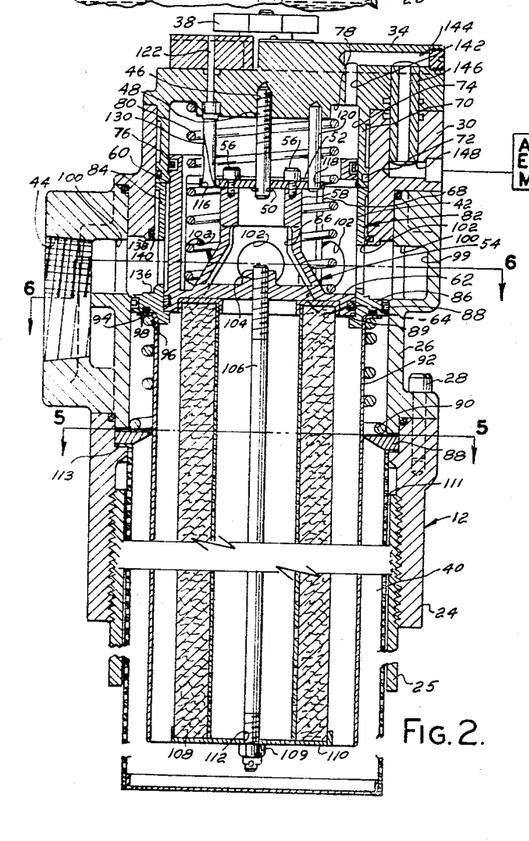
FIG. 2 is a longitudinal cross-sectional view of the filter device of the present invention.
Figure 3:
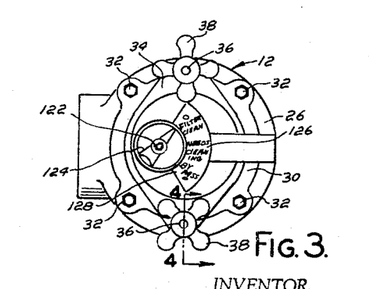
FIG. 3 is a top view of the filter device illustrated in FIG. 2.
Figure 4:
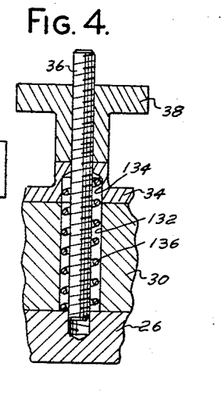
FIG. 4 is a fragmentary cross-sectional view as seen substantially from line 4—4 of FIG. 3.
Figure 6:
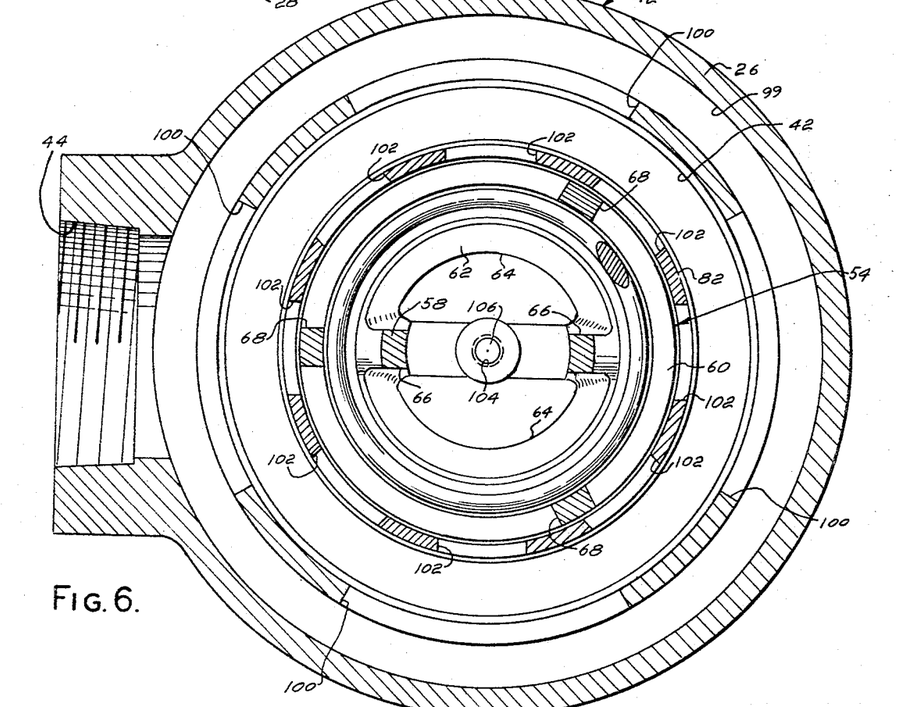
FIG. 6 is a transverse cross-sectional view taken substantially from line 6—6 of FIG. 2.

As can best be seen in FIGS. 2 and 6, the housing members 24, 26, and 30 are each hollow to provide a filter chamber 40 and an outlet chamber 42 substantially axially aligned with the filter chamber 40. The housing member 26 is provided with an outlet 44 open radially to the outlet chamber 42.

The cap member 34 is provided with a threaded perforation 46 which receives the threaded end of a rod member 48. The rod member 48 extends axially to the outlet chamber 42 and is provided adjacent its free end with a snap ring 50. An arm member 52 is axially slidably carried by the rod member 48 and is prevented from disengaging from the rod member 48 by the snap ring 50.

A porting member 54 is secured to the arm member 52 as by screws 56 and is axially slidable therewith in the outlet chamber 52. The porting member 54 is provided with an inner substantially annular portion 58 and an outer annular portion 60 integrally joined by a radially extending lower portion 62. The lower portion 62 is provided with a plurality of annularly spaced openings 64, as can best be seen in FIG. 6, and the inner annular portion 58 as well as the outer annular portion 60 of the porting member 54 are respectively provided with annularly spaced ports 66 and 68.

The cap member 34 is provided with an axially extending annular flange 70 forming a cylinder which extends into the outlet chamber 42 closely adjacent to the periphery of the inner wall of the spacer housing member 30. An O-ring seal 72 prevents fluid leakage between the spacer housing member 30 and the flange 70. The inner surface of the flange 70 provides a guide surface 74 upon which the upper end of the outer annular portion 60 axially slides. A piston ring 76 prevents fluid leakage between the annular portion 60 and the guide surface 74.

The cap member 34 is further provided with a recessed portion 78 which forms a seat for one end of a spring member 80. The other end of the spring member 80 is seated against the lower portion 62 and urges the porting member 54 axially away from the cap member 34.

A valve member 82 is provided with an axially extending annular portion 84 which extends intermediate the annular outer portion 60 of the porting member 54 and the wall of the spacer housing member 30. At the lower end of the valve member 82 a radially extending flange 86 is provided. The flange 86 carries a piston ring 88 which slidably engages the inner surface of the housing 26 and forms a seat 89 which receives the lower annular edge of the porting member 54.

Figure 5:
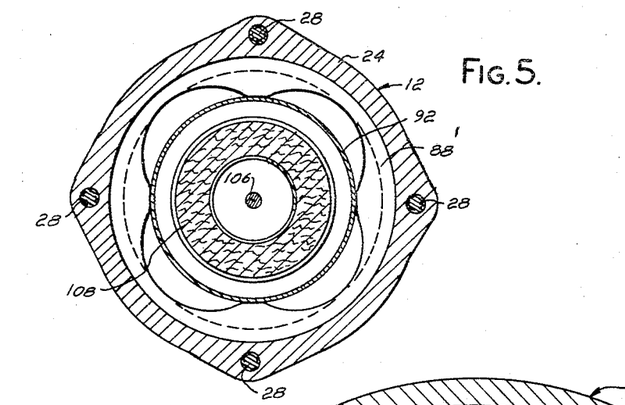
FIG. 5 is a transverse cross-sectional view as taken substantially from line 5—5 of FIG. 2.

As can best be seen in FIGS. 2 and 5, a seat member 88' is sandwiched in position at the juncture of the housing 26 and the tubular housing member 24 to provide the seat for one end of the spring member 90. The seat member 88' is preferably scalloped as shown in FIG. 5 to permit fluid passage therethrough. An elongated tube 92 is axially positioned within the filter chamber 40 and is provided at its upper end with a radially outwardly extending flange portion 94. The spring member 90 engages the flange portion 94 and urges the tube 92 upwardly into a suitable annular recess 96 provided in the lower surface of the valve member 82. An O-ring seal 92 is provided intermediate the valve member 82 and the tube 92. It is apparent that the spring member 90 urges the tube 92 and the valve member 82 toward the position shown in FIG. 2 in which the upper edge of the valve member 82 engages the lower edge of the flange 70 of the cap member 34.

As can best be seen in FIG. 6, the housing member 26 is cored to provide an annular chamber 99 and in communication with the outlet 44 and a plurality of annularly spaced ports 100 opening to the chamber 99. The valve member 82 is also provided with a plurality of annularly spaced ports 102 which are normally positioned to provide communication between the outlet chamber 42 and the annular chamber 99.

The lower portion 62 of the supporting member 54 is provided with a central threaded opening 104 which receives one end on an elongated rod 106. The rod extends axially into the filter chamber 40 and provides the means by which a substantially cylindrical filter element 108 is carried within the filter chamber 40. The rod 106 is threaded at its free end to receive the nut member 109 for locking the filter element 108 to the porting member 54.

A tubular screen member 111 is provided with a radially outwardly extending flanged portion 113 which is sandwiched between the seat member 88 and the tubular housing 24. The tubular screen member 111 preferably extends into the reservoir 10 to a position below the minimum level of the fluid 20 carried therein.

The arm member 52 is provided at each end with slots 116 and 118 respectively. The slot 118 slidably receives a guide pin 120 which is carried by the cap member 34. As can best be seen in FIGS. 2–3, a shaft 122 is rotatably carried in the cap member 34. A pointer element 124 located on the exterior surface of the cap member 34 and secured to the shaft 122 to rotate therewith points to indicia 126 provided on the indicator plate 128. The slot 116 is rectangularly formed and is in alignment with the shaft 122. The free end of the shaft 122 carries an actuator element 130 which is received in the slot 116. The actuator element 130 preferably comprises an elongated strip having a substantially uniform twist about its longitudinal axis from end to end. It is apparent then that the axial movement of the porting member 54 will cause the arm member 52 to move axially with respect to the actuator element 130. Engagement of the actuator element 130 in the slot 116 during this movement will produce a rotation of the shaft 122 and the pointer element 124.

In operation fluid is normally pumped by the pump 14 through the screen member 111 and through the open end of the tube 92 and radially inwardly through the filter element 108. The fluid then flows axially through the opening 64 provided in the lower portion 62 of the porting member 54. From there the fluid normally flows radially outwardly through the ports 66 and 68 of the porting member 54, through the ports 102 in the valve member 82, the ports 100 and into the chamber 99 to the outlet.

As the filter element 108 becomes clogged, an increase in the pressure differential across the element will be produced. Since the upper surface of the portion 62 of the porting member 54 is exposed to the pressure on the outlet side of the filter element 108 and a portion of the lower surface of the portion 62 is exposed to the pressure on the inlet side of the filter element 108 when the increased pressure differential reaches a value sufficient to overcome the force exerted by the spring member 80, the porting member 54 will move axially toward the cap member 34.

Each change in the axial position of the porting member 54 will produce a corresponding change in the position of the pointer element 124 because the movement of the porting member 54 is transmitted through the arm member 52 and the actuator element 130 to produce a corresponding rotation of the shaft 122. Thus with proper indicia 126 on the indicator plate 128 the clogged condition of the filter element 108 is visibly indicated exteriorly of the filter device 12.

As the filter element 108 continues to become clogged and prior to the danger of the increased pressure differential across the element 108 causing the same to rupture, the porting member 54 will have moved axially sufficiently to open a fluid path directly from the inlet side of the filter element 108 and between the porting member 54 and valve member 82 through the ports 102 to the outlet 44.

As long as the cap member 34 is in place, the valve member 82 will remain in the position shown because of the engagement of the lower edge of the flange 70 of the cap member 34 with the upper edge of the valve member 82.

When it is desired to remove the filter element 108 for cleaning or replacement the nut members 38 are loosened to permit removal of the cap member 34 from the spacer element 30. As can best be seen in FIG. 4, the threaded members 36 are preferably retained by the housing member 26 to extend upwardly through the spacer member 30 and the cap member 34. Since the spacer member 30 is also secured to the housing member 26 by the bolts 32, removal of the nut members 38 permits the removal of the cap member 34 and the spacer member 30 will remain securely fixed to the housing member 26. The openings 132 through the spacer member 30 which receive the threaded members 36 are of a somewhat larger diameter than that of the members 36 as shown and the cap member 34 is provided with an annularly recessed portion 134 in axial alignment with the openings 132. A spring 136 is carried in each of the openings 132 and seats in the recessed portion 134 to urge the cap member 34 away from the spacer member 30 so that upon loosening the nut members 38 the springs 136 will aid in breaking the seal line between the cap member 34 and the spacer member 30.

Removal of the cap member 34 will cause the porting member 54 and the filter element 108 to be removed from the device 12 since the snap ring 50 prevents the porting member 54 from slipping off the end of the rod member 48. This permits the filter element 108 to be either cleaned or replaced.

Also as the cap member 34 is being removed, the lower edge of the flange 70 will be moved axially away from the upper edge of the valve member 82. The spring member 90 then will cause the tube 92 and the valve member 82 to be moved axially upwardly until a stepped portion 136 formed in the upper surface of the flange 86 seats in a complementarily formed portion 138 of the spacer member 30. In this way the valve member 82 opens a fluid path directly from the reservoir 10 intermediate the tube 92 and the extension 25 through the scalloped spring seat member 88' to the outlet 44. The spacer member 30 carries an O-ring seal 140 which prevents air from entering the fluid system between the portions 136 and 138. In this way the fluid system can continue to operate without interruption while the filter element 108 is being cleaned or replaced. Removal of the cap member 34 actuates the valve member 82 automatically and the changeover from normal flow to the redirected flow is automatic and smooth with little danger of air entering the system as the changeover takes place.

As can best be seen in FIG. 2, the cap member 34 is provided with a passage 142 which communicates with the upper portion of the outlet chamber 42. The transverse passage 144 provides communication between the passage 142 and the tube 146. The passage 148 is provided preferably connected to any preferred air evacuating means 150. Preferably the tube 146 is secured to the spacer member 30 so that upon removal of the cap member 34, the tube 146 will remain in place.

After the filter member element 108 has been cleaned or replaced and is installed with the porting member 54 back in the filter device, the flange 70 of the filter cap member 34 will urge the valve member 82 toward a position opening fluid flow through the filter element 108 as the nut members 38 are being tightened. The tube 146 acts as a dowel pin aiding in the repositioning of the cap member 34 and the spacer member 30. During tightening of the nut members 38, the air evacuating means 150 is actuated to remove air trapped in the outlet chamber 42 and in the interior portion of the filter element 108 by the cap member 34. To insure that the valve member 82 will not return to the normal position until all of the entrapped air has been removed from the device, the springs 136 are sufficiently strong to prevent the installer from pressing the cap member 34 against the spacer member 30 as he is tightening the nut member 38 since this would cause the valve member 82 to move prematurely and permit air to enter the system.

By providing the passages 142, 144, 148 and the tube 146 a means has been provided insuring that entrapped air will be removed and yet which it is not necessary to disconnect the evacuating means 150 from the filter device 12 when it is necessary to clean or replace the filter element 108. Since the air evacuating means 150 is connected to the spacer member 30, removal of the cap member 34 does not require disconnection of the air evacuating means.

Figure 7:
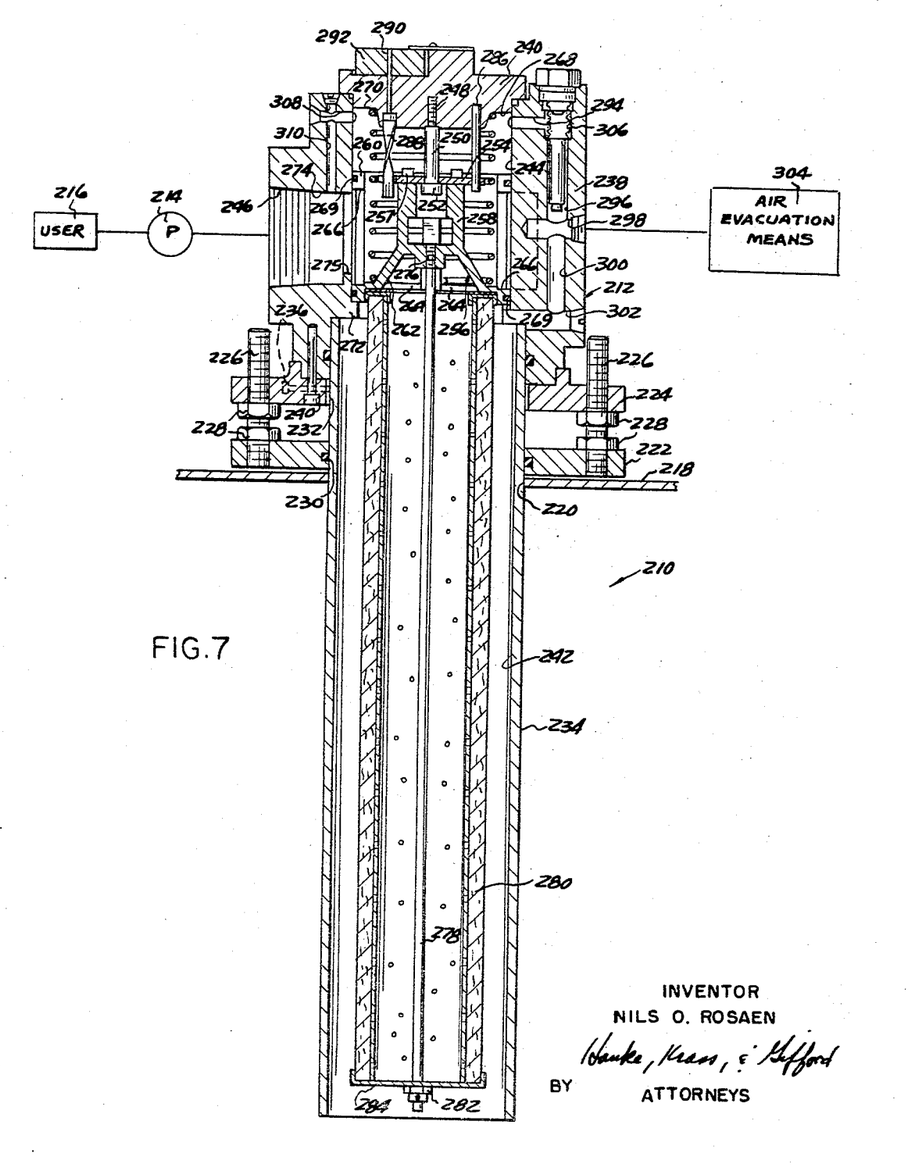
FIG. 7 is a longitudinal cross-sectional view of another preferred filter device of the present invention illustrating diagrammatically several components of the preferred system connected to the device.

Referring to FIG. 7 for a description of another preferred embodiment of the present invention, a preferred fluid system is therein illustrated as comprising a fluid reservoir 210, a filter device 212, a fluid pump 214, and a fluid user 216. The fluid reservoir 210 preferably comprises a top plate 218 and is at least partially filled with a suitable fluid (not shown). An opening 220 is provided in the plate 218.

The filter device 212 preferably includes a first mounting member 222 carried by the plate 218 and a second mounting member 224 spaced from the mounting member 222 by a plurality of threaded rods 226 and nut members 228 carried by the threaded rods 226 intermediate the mounting members 222 and 224. It is apparent that the space between the mounting members 222 and 224 may be adjustably varied by rotating the nuts 228 along the rods 226. The mounting members 222 and 224 are respectively provided with openings 230 and 232 which are aligned with the opening 220 in the top plate 218. A tubular housing member 234 is secured to the mounting member 224 by means of a plurality of radially inwardly extending bolts or screws 236 and extends downwardly through the openings 232, 230, and 220 into the reservoir 210 to a position below the level of the fluid therein.

The filter device 212 preferably further comprises a housing member 238 secured to the mounting member 224 by means of bolts 240 and encompassing the upper edge of the tubular housing 234. A clean-out cap member 240 is secured to the housing member 238 by a plurality of bolts (not shown).

The tubular housing member 234 defines a filter chamber 242 and a cap member 240 and the housing 238 defines an outlet chamber 242 communicating with the filter chamber 242.

An outlet 246 is provided in the housing 238 opening radially to the outlet chamber 244.

The cap member 240 is provided with a threaded perforation 248 which receives the threaded shank of the bolt member 250. The bolt member 250 extends axially in the outlet chamber 244 and is provided at its free end with an enlarged head portion 252. An arm member 254 is axially slidably carried by the bolt 250 by the head portion 252.

A porting member 256 is secured to the arm member 254 by bolts or screws 257 and is axially slidable therewith in the outlet chamber 244. The porting member 256 is provided with an inner substantially annular portion 258 and an outer annular portion 260 integrally joined by a plurality of annularly spaced angularly extending legs 262. The legs 262 define a plurality of annularly spaced openings 264 and the outer annular portion 260 of the porting member 256 is provided with a plurality of annularly spaced ports 266. The cap member 240 is further provided with a recessed portion 268 which forms the seat for one end of a spring member 270. The other end of the spring member 270 is seated against an annular seat formed at the ends of the leg portions 262 of porting member 256. The spring 270 therefore urges the porting member 256 axially along the guide surface formed in the housing 238 by the outlet chamber 244 and away from the cap member 240. Piston rings 269 are carried at axially spaced points on the outer annular portion 260. A radially inwardly extending flange portion 272 formed in the housing 238 limits inwardly axial movement of the porting member 256 and in combination with the spring 270 normally positions the porting member 256 in an axial position in which the ports 266 are aligned with the annularly spaced ports 275 and a substantially annular outlet chamber 274 communicates with the outlet 246.

The porting member 256 is provided with a central threaded opening 276 which receives one end of an elongated rod 278. The rod 278 extends axially into the filter chamber 242 and provides the means by which a substantially cylindrical filter element 280 is carried within the filter chamber 242. The rod 278 is threaded at its free end to receive the nut member 282 and the filter element 280 is provided with a closure plate 284 at its free end having an opening to receive the rod 278 so that tightening the nut member 282 locks the filter element 280 to the porting member 256.

The arm member 254 is slotted at each end to respectively receive the guide pin 286 carried in the cap member 240 and an actuator element 288. The actuator element 288 preferably comprises an elongated strip having a substantially uniform twist about its longitudinal axis from end to end so that upon axial movement of the porting member 256 the rectangular slot formed in the arm member 254 and receiving the actuator element 288 produces a rotation of the actuator element 288 corresponding with the axial movement of the porting member 256 substantially as described above with reference to the embodiment of FIGS. 1–6. The indicating means further includes a shaft 290 rotatably carried in the cap 240 and secured to actuator element 288 for rotation therewith. A pointer element 292 is carried by the shaft 290 to rotate therewith and to point to suitable indicia provided on the exterior surface of the cap member 240 substantially as described above.

In operation of the embodiment illustrated in FIG. 7, fluid is normally pumped by the pump 214 into the filter chamber 242 radially inwardly through the filter element 280, through the slots 264 and the ports 266 provided in the porting member 256 and into the outlet chamber 274 and through the outlet 246.

As the filter element 280 becomes clogged, an increase in the presence differential across the element will be produced substantially as described above with reference to the emboidment of FIGS. 1–6. This pressure differential increase as described above will cause the porting member 256 to move against the force exerted by the spring member 270 and axially toward the cap member 240. Similarly each change in the axial position of the porting member 256 will produce a corresponding change in position of the pointer element 292 so that with proper indicia (not shown) on the exterior surface of the member 240 the clogged condition of the element 280 will be visibly indicated exteriorly of the filter device 212.

As the filter element 280 continues to become clogged and prior to the danger of the increased pressure differential across the element 280 causing the same to rupture, the porting member 256 will have moved axially sufficiently to open a fluid path directly from the inlet side of the filter element 280 past the flange 272 and into the outlet chamber 274 to the outlet 246 again substantially as described above with reference to FIGS. 1–6.

When it is desired to remove the filter element 280 for cleaning or replacement, the cap member 240 is removed. The removal of the cap member 240 will cause the porting member 256 and the filter element 280 to be removed from the device 212 since the enlarged head 252 of the bolt 250 prevents the porting member 256 from slipping off the end of the bolt 250. The filter element 280 then can be readily cleaned and/or replaced.

To remove the air which would become entrapped within the filter housing 238 upon reassembly of the device, the housing 238 is provided with a radially extending passage 294 which communicates with the upper portion of the chamber 244. An axially extending passage 296 is provided in the housing 238 in communication with the radially extending portion 294 and an outlet passage 298 is provided in the housing 238 in communication with the passage 296. A filter member 306 is provided in passage 296. An axial passage 300 and a radially inwardly extending passage 302 provide communication between the outlet passage 298 and the upper portion of the filter chamber 242 on the inlet side of the filter element 280. A suitable selectively operable air evacuation means 304 is connected to the outlet passage 298.

After the filter element 280 has been cleaned or replaced and is installed with the porting member 256 back in the filter device 212, the air evacuation means 304 is actuated to remove air trapped in the upper portion of the outlet chamber 242 and the interior of the filter element 280 by means of the passages 294, 296 and 298 and also to remove the trapped air from the upper portion of filter chamber 242 on the inlet side of the filter element 280 by means of passages 302, 300 and 298.

The housing 238 is further provided with a radially extending passage 308 registering with the upper portion of the filter chamber 242 and an axially extending passage 310 connected with the chamber 274 and thus with the outlet 246. During operation of the filter system, the pump 214 causes air which would otherwise become entrapped in the filter housing 238 to be drawn from the upper portion of the outlet chamber 244 through the passages 308 and 310 out the outlet 246. The filter member 306 insures that any fluid that may bypass the filter element 280 with entrapped air during the operation of the system will become filtered before passing through the outlet 246. In this way, during operation of the fluid system, the pump 214 is used to continuously bleed air that would otherwise become trapped in the filter housing 238. This produces a more efficient filtering system by insuring that all of the filter element 280 will be used to perform the filtering function and by preventing accumulated air from being ejected into the system at irregular intervals to cause damage to the system components and to upset constant outlet pressures.

Figure 8:
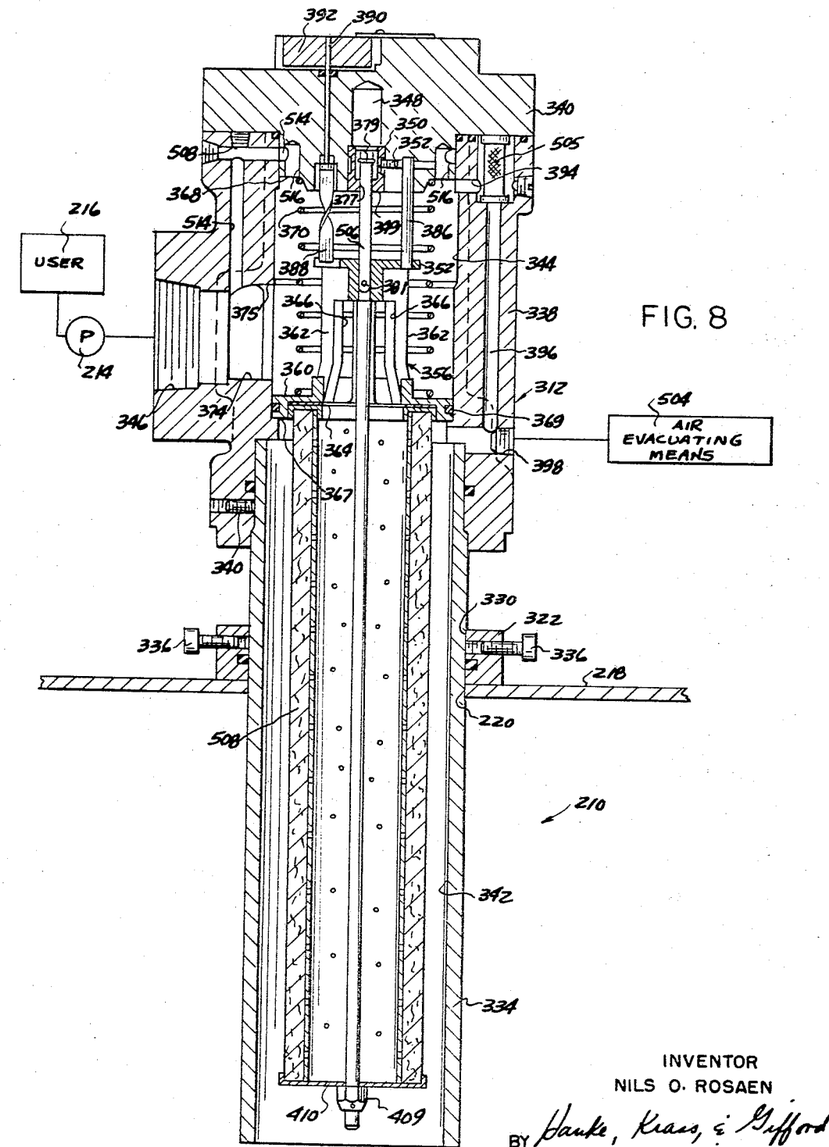
FIG. 8 is a view similar to FIG. 7 but illustrating still another filter device.

FIG. 8 illustrates another preferred embodiment of the present invention similar to the embodiment of FIG. 7 but utilizing a somewhat simpler construction of the filter device. A preferred filter device 312 is therein illustrated as comprising a mounting member 322 carried by the top plate 218 of the reservoir 210. An elongated tubular housing member 334 extends through an opening 330 provided in the mounting member 322 and through the opening 220 provided in the top plate 218 into the reservoir 210. The tubular housing member 334 is adjustably secured to the mounting member 322 by means of bolts or screws 336.

The filter device 312 preferably further comprises a housing member 338 closing the upper end of the tubular housing member 334 and secured thereto by bolts or screws 340. The tubular housing member 334 forms a filter chamber 342 and the housing member 338 forms an outlet chamber 344 in communication with the filter chamber 342. The housing member 338 is provided with an outlet chamber 346 opening radially to the outlet chamber 342 through a substantially annular chamber 374 and a plurality of annularly spaced ports 375.

A cap member 340 is preferably secured to the housing member 338 by any convenient means such as bolts or screws (not shown) and closes the outlet chamber 344. The cap member 340 is provided with an axial recess 348 having a radially enlarged portion 349. A cylindrical cup member 350 is carried in the enlarged portion 349 of the recess 348 by means of a set screw 352. An elongated rod 406 extends axially through an opening 377 provided in the cup member 350 and is axially slidably mounted in the cup member 350. Separation of the cup member 350 and the rod 406 is prevented by a snap ring 379.

A porting member 356 is fixed to the rod 406 by means of a pin 381 to move axially therewith in the outlet chamber 344. The porting member 356 comprises an upper substantially annular radially extending portion 352 and a lower annular radially extending portion 360 integrally joined by axially extending legs 362. The lower portion 360 is provided with a peripheral flange 367 which carries a piston ring 369 engaging the inner wall of the housing 338 and a central opening 364 communicating with the interior of the filter chamber 342. The legs 362 define annularly spaced ports 366 providing communication between the central opening 364 and the outlet 346 through ports 375 and chamber 374.

The cap member 340 is further provided with a recessed portion 368 which form the seat for one end of a spring 370. The other end of the spring 370 is seated against the lower portion 360 of the porting member 356 and urges the porting member 356 axially away from the cap member 340.

The rod 406 is enlarged somewhat axially downwardly of the pin 381 and extends through the porting member 356 and into the filter chamber 342. A substantially cylindrical filter element 408 is carried by the rod 406 within the filter chamber 342 and is locked to the lower portion 360 of porting member 356 by means of a nut 409 and a closure plate 310.

The upper portion 352 of porting member 356 is slotted to receive a guide pin 386 and an actuator element 388. The actuator element 388 is twisted and secured to the shaft 390 which is in turn secured to a pointer element 392 so that axial movement of the porting member 356 produces a corresponding rotational movement of the pointer element 392 substantially as described above.

The housing member 338 is provided with an axially extending passage 396 communicating with a radially extending air outlet passage 398. The passage 398 extends into the upper portion of the filter chamber 342 on the inlet side of the filter element 380. A radially extending passage 394 provides communication between the upper portion of the outlet chamber 344 and passage 396. A filtering means 506 is carried in the passage 396.

An annular recess 514 is provided in the cap member 340 and a plurality of axially extending passages 516 provide communication between the upper portion of the outlet chamber 344 and the recess 514. The housing member 338 is provided with a passage 508 registering with recess 514 and passage 510 providing communication between the passage 508 and chamber 374.

The filter device 312 operates substantially as described above with reference to the filter device 212. The device 312 differs from the device 212 only in the more simplified construction of the porting member and the air bleed passages.

Figure 9:
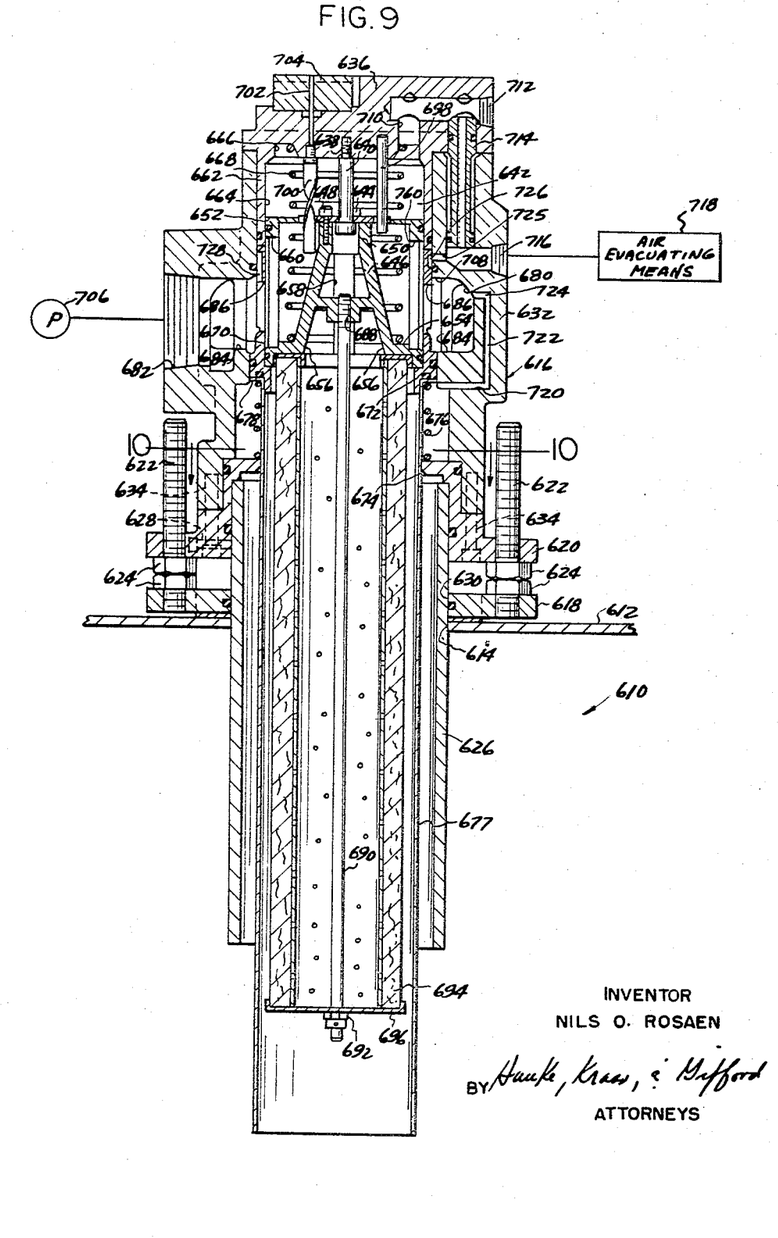
FIG. 9 is a longitudinal cross-sectional view of still another filter device of the present invention.
Figure 10:
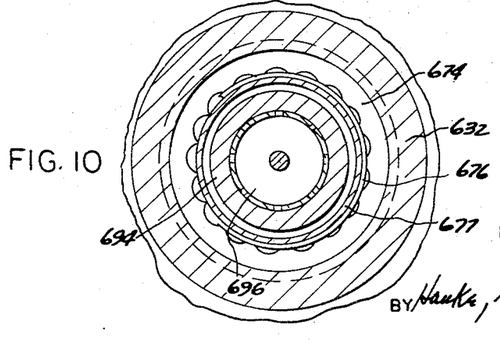
FIG. 10 is a transverse cross-sectional view taken substantially on line 10—10 of FIG. 9.
Figure 11:
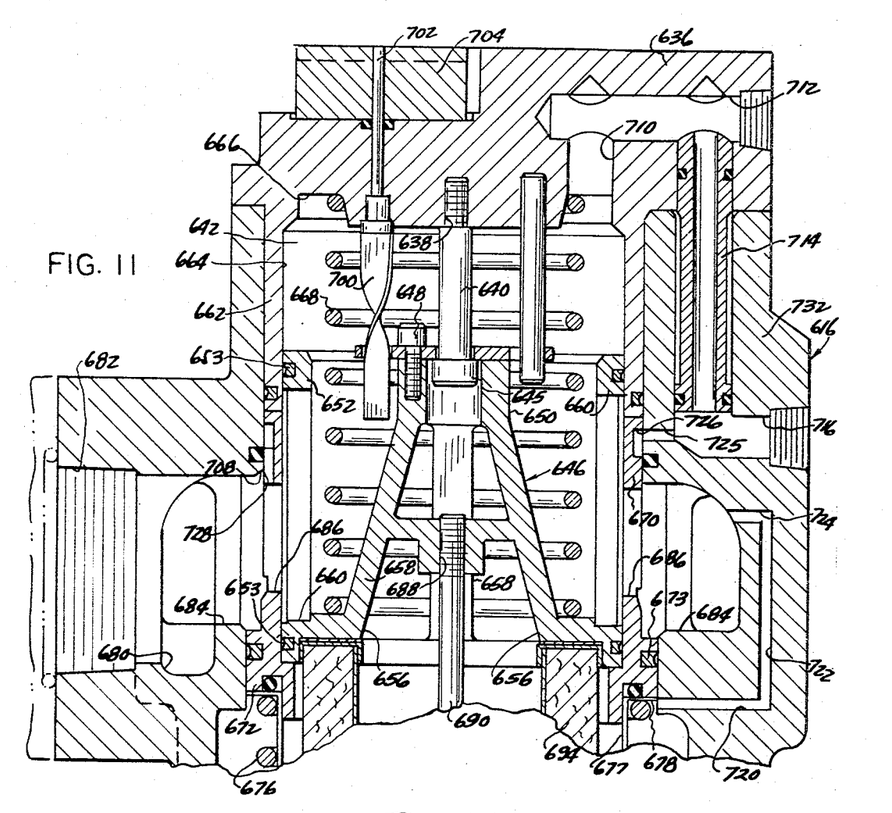
FIG. 11 is an enlarged fragmentary view of a portion of the structure illustrated in FIG. 10.

Now referring to FIGS. 9–11 for a detailed description of still another preferred embodiment of the present invention, a portion of the fluid reservoir generally indicated at 610 is illustrated in FIG. 9 as comprising a top plate 612 and is at least partially filled with a suitable fluid (not shown). An opening 614 is provided in the plate 612.

A filter device is generally indicated at 616 and preferably includes a mounting member 618 secured to the top plate 612 by any convenient means, and a spacer mounting member 620 adjustably carried by the mounting member 618 by a plurality of threaded rods 622. The spacing between the mounting members 618 and 620 can be adjusted by moving nut member 624 along the threaded rod 622 intermediate members 618 and 620. A tubular housing member 626 is secured to the mounting member 620 by means of annularly spaced bolts or screws 628 and extends downwardly through an opening 630 in the mounting member 618 and the opening 614 in the top plate 612 into the interior of the reservoir 610. The tubular member 626 preferably extends below the level of the fluid in the reservoir 610.

The filter device 616, as can best be seen in FIG. 11, further preferably comprises a housing member 632 secured to the mounting member 620 by bolts or screws 634 and a cap member 636 secured to the housing member 632 by any convenient means such as bolts or the like (not shown). The cap member 636 is provided with a threaded perforation 638 which receives the threaded end of a bolt 640. The bolt 640 extends axially into an outlet chamber 642 defined by the housing 632 and an arm member 644 is axially carried by the bolt 640 with the head portion 645 of the bolt 640 preventing disengagement therefrom.

A porting member 646 is secured to the arm member 644 as by screws 648 and is axially slidable therewith in the outlet chamber 642. The porting member 646 is provided with an inner substantially annular portion 650 receiving the screws 648 and an outer annular portion 642 integrally joined with the portion 650 by a radially extending lower portion 654. The lower portion 654 is provided with a plurality of annularly spaced openings 656 and the inner annular portion 650, as well as the outer annular portions 652 of the porting member 646 are respectively provided with annular spaced ports 658 and 660 respectively.

The cap member 636 is further preferably provided with an axially extending annular flange 662 forming a cylinder and extending into the outlet chamber 642 closely adjacent the periphery of the inner wall of the housing member 632. The inner surface of the flange 662 provides a guide surface 664 upon which the upper end of the outer annular portion 652 axially slides. The lower end of the outer end of the portion 652 slides axially on a guide surface formed in a valve member 670 and as can best be seen in FIG. 11, piston rings 653 are carried by the flange portion 652 to engage surface 654 and the valve 670. The cap member 636 is also provided with an annular recessed portion 666 which forms the seat for one end of a spring member 668. The other end of a spring member 668 is seated against the lower portion 654 of the porting member 646 to urge the porting member 646 axially away from the cap member 636.

The valve member 670 is provided with an axially extending annular portion which extends intermediate the annular portion 652 of the porting member 646 and the wall of the housing member 632. At the lower end of the valve member 670 a radially extending flange 672 is provided to form a seat for seating the lower annular edge of the porting member 646. The flange 672 is provided with a piston ring 673 which prevents fluid leakage between the valve 670 and the housing member 632.

As can best be seen in FIGS. 9 and 10, the mounting member 620 is provided with a scalloped radially inwardly extending flange portion 674 which forms the seat for one end of the spring member 676. An elongated tube 677 is axially positioned radially inwardly from the tubular housing member 626 and is provided at its upper end with a radially outwardly extending flange portion 678. The spring member 676 engages the flange portion 678 and urges the tube 677 upwardly into a suitable recess provided in the lower surface of the valve member 670. The spring member 676 thus urges the tube 677 and the valve member 670 toward a position in which the upper edge of the valve member 670 engages the lower edge of the flange 662 of cap member 636.

The housing 632 is preferably formed to provide an annular chamber 680 in communication with an outlet 682 and a plurality of annularly spaced ports 684 opening to the outlet chamber 642. The valve member 670 is provided with a plurality of annularly spaced ports 686 which are normally positioned to provide communication between the outlet chamber 642 and the annular chamber 680.

The porting member 646 is provided with a central threaded opening 688 which receives one end of an elongated rod 690. The rod 690 extends axially into the tube 677 and is threaded at its free end to receive a nut 692. The rod 690 and the nut 692 provide the means by which a substantially cylindrical filter element 694 is carried within the tube 677. The filter element 694 is provided at its free end with a closure plate 696 receiving the rod 690 so that tightening the nut 692 locks the filter element 694 to the porting member 646. The closure plate 696 prevents fluid from flowing from the reservoir 610 directly into the interior of the filter element 694.

The arm member 644 is slotted at each end to axially, slidably receive a guide pin 698 and an actuator element 700 respectively. The guide pin 698 is carried in the cap member 636 and provides a means for guiding the axial movement of the porting member 646. The actuator element 700 is twisted about its longitudinal axis from end to end and is secured to a shaft 702 which is in turn secured to a porting element 704 so that axial movement of the porting member 646 produces a corresponding rotational movement of the porting element 704 substantially as described above.

In operation, fluid is normally pumped by a pump 706 through the open end of the tube 677 and radially inwardly through the filter element 694. The fluid then flows axially through the opening 656 provided in the porting member 646 and radially outwardly through the ports 660, the ports 686, the ports 684, and into the chamber 680 and out the outlet 682.

As the filter element 694 becomes clogged, an increase in the pressure differential across the element will be produced. Since the upper surface of the portion 654 of the porting member 646 is exposed to pressure from the outlet side of the filter element 694 and a portion of the lower surface of the portion 654 of porting member 646 is exposed to pressure on the inlet side of the filter element 694, when the pressure differential is increased to a predetermined value sufficient to overcome the force exerted by the spring member 668, the porting member 646 will move axially toward the cap member 636 substantially as described above.

Similarly each change in the axial position of the porting member 646 will produce a corresponding change in the position of the pointer element 704 as described above so that the clogged condition of the filter element 694 will be visibly indicated exteriorly of the filter device 616.

As the filter element 694 continues to become clogged and prior to the danger of the increased pressure differential across the element 694 causing the same to rupture the porting member 646 will have moved axially sufficiently to open a bypass path bypassing the filter element 694 by opening a path intermediate the porting member 646 and the valve member 670 substantially as described above. Also as described above, because of the engagement of the lower edge of the flange 662 of the cap member 636 and the upper edge of the valve member 670, the valve member 670 will remain in a fixed position as long as the cap member 636 is in place.

When it is desired to remove the filter element 694 for cleaning or replacement, the cap member 636 is removed from the housing 632. The removal of the cap member 636 will cause the porting member 646 and the filter element 694 to be removed from the device substantially as described above. Also, as described above with reference to FIGS. 1–6, as the cap member 636 is being removed, the spring 676 will urge the tube 677 and the valve member 670 axially upwardly until the upper surface of the flange 672 seats in a complementarily formed portion 708 formed in housing member 632. In this position the valve member 670 in combination with the tube 677 opens a fluid path directly from the fluid reservoir 610 intermediate the tube 677 and the tubular housing 626 through the scalloped flange member 674 of the mounting member 620 directly to the outlet 682. In this respect the device of FIGS. 9–11 operates substantially like the device in FIGS. 1–6 in that removal of the cap member 363 actuates the valve member 670 automatically and the change over from the normal flow to the redirected flow is automatic and smooth and there is no danger of air entering the system as the change over takes place.

The cap member 636 is provided with a passage 710 which communicates with the upper portion of the outlet chamber 642. A transverse passage 712 provides communication between the passage 710 and the tube 714. The tube 714 is carried in a suitable recess provided in both the cap member 636 and the housing member 632. A transverse passage 716 is provided in the housing 632 and communicates with the interior of the tube 714. The passage 716 is preferably connected to any preferred air evacuation means 718.

After the filter element 684 has been cleaned or replaced and is installed with the porting member 646 back in the filter device 616, the flange 662 of the cap member 636 will urge the valve member 680 toward a position opening normal flow through the element 694. Before the restoration of normal operation of the system, the air evacuating means 718 is actuated to remove air trapped in the outlet chamber 642 and in the interior portion of the filter element 694 upon closing of the cap member 636.

The device of FIGS. 9–11 as it has been so far described is substantially that as disclosed in the embodiment of FIGS. 1–6. The improvement over that embodiment will now be described in detail. Turning to FIG. 11, it can be seen that the housing member 632 is provided with a radially extending passage 720 connecting the interior of the housing 632 adjacent the normal position of the flange member 672 of valve member 670 with an axially extending passage 722. The axially extending passage 722 is connected by a radially inwardly extending passage 724 with the upper portion of chamber 680. Further, the housing 632 is provided with an inwardly extending passage 725 connecting with the passage 716. An annular recess 726 is provided in the valve member 670 in a position to register with the passage 725 when the valve members 670 is in its normal position. An axially extending recess 728 is provided in the valve member 670 to provide communication between the recess 726 and the upper portion of the outlet chamber 680 adjacent the outlet 682.

It has been found that during operation of the fluid system disclosed in FIGS. 1–6, air tends to be entrapped in the upper portion of the chamber defined by tubular housing 626 and the tube 677 as well as in the upper portion of the outlet chamber 642. Unless removed, this air will accumulate and eventually will interfere with efficient operation of the filter device. While the air collecting in the upper portion of the outlet chamber 642 could be removed by a periodic actuation of the air evacuating means, it is more desirable to have an automatic means of removing such air which does not require closing down the operation of the fluid system. By providing the passage 725 and the recesses 726 and 728, air collecting in the upper portion of the outlet chamber 642 will be drawn by the pump 706 and 728 to pass out of the filter device through the fluid outlet 682. Likewise, air tending to collect in the lower edge or the inlet side of the valve member 670 will be drawn by the pump 706 through the passages 720, 722, 724 and into the outlet chamber 680 and out the outlet 682.

It is apparent that the several embodiments of the present invention provide a filter device permitting continued and uninterrupted operation of the fluid system during cleaning or replacement of the filter element by providing automatically actuated valve means opening a path bypassing the filter element upon removal thereof. In this way the device of the present invention offers considerable advantages over the filter devices of the aforementioned copending applications.

It is also apparent that although I have described but several embodiments of the present invention, many changes and modifications can be made therein without departing from the spirit of the invention as expressed by the scope of the appended claims.

I claim:
1. In a fluid system having a fluid reservoir a filter device comprising,
 (a) a tubular member carried by said reservoir in a position having one end disposed below the level of the fluid in said reservoir,
 (b) a housing secured to said tubular member and extending exteriorly of said reservoir and having a chamber communicating with said reservoir through said tubular member,
 (c) said housing being provided with an outlet communicating with said chamber,
 (d) a filter element removably carried in said chamber and having an inlet side open to said tubular member and an outlet side normally open to said outlet, a porting member axially slidably carried in said chamber, said porting member being provided with a radially extending flange portion normally positioned to block fluid flow from the inlet side of said filter element to said outlet and having one side exposed to the pressure on the inlet side of said filter element and an opposite side exposed to the pressure on the outlet side of said filter element whereby said porting member axially moves in response to changes in the pressure differential across said filter element, said porting member being movable upon a predetermined increase in the pressure differential across said filter element to a position in which said flange portion moves past the outlet to open a fluid path from the inlet side of said filter element to said outlet whereby to bypass said filter element, and
 (e) valve means associated with said porting member and said housing and being automatically operable upon removal of said filter element to open a fluid path directly from said reservoir to said outlet.

2. The filter device as defined in claim 1 and including indicating means disposed exteriorly of said reservoir and operably connected to said porting member to indicate the axial position thereof.

3. The device defined in claim 1 and including indicator means disposed exterior of said reservoir and operably connected to said porting member to indicate the axial position thereof.

4. The device as defined in claim 1 and including selectively operable air evacuating means connected to the outlet side of said filter element.

5. The filter device as defined in claim 1 and including means defining an air evacuation path between the inlet side of said filter element and said outlet.

6. The filter device as defined in claim 5 and including means defining a second air evacuation path intermediate the outlet side of said filter element and said outlet.

7. A system as defined in claim 5 and including a selectively operable air evacuating means connected with the outlet side of said filter element.

References Cited

UNITED STATES PATENTS

| | | | |
|---|---|---|---|
| 2,057,779 | 10/1936 | Jacobs | 210—172 |
| 2,170,074 | 8/1939 | Hewitt | 210—444 X |
| 2,929,503 | 3/1960 | Ambruster et al. | 210—120 |
| 2,983,384 | 5/1961 | Winslow | 210—130 X |
| 2,994,403 | 8/1961 | Winslow | 210—304 X |
| 3,113,925 | 12/1963 | Rosaen | 210—131 X |
| 3,288,289 | 11/1966 | Rosaen | 210—90 |
| 3,288,290 | 11/1966 | Rosaen | 210—90 |

SAMIH N. ZAHARNA, *Primary Examiner.*